March 20, 1934.  N. W. COLE  1,951,750
WELDING ROD
Filed July 21, 1930
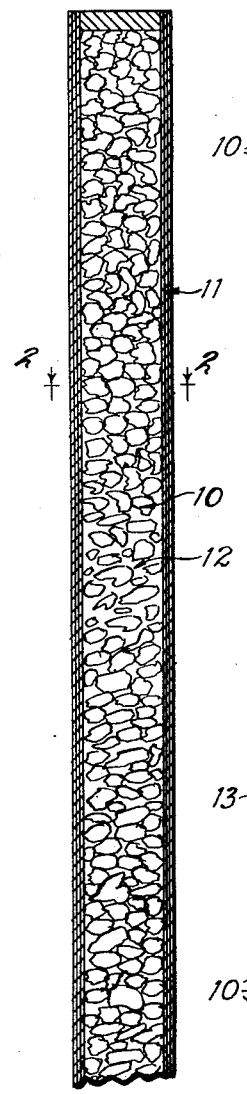
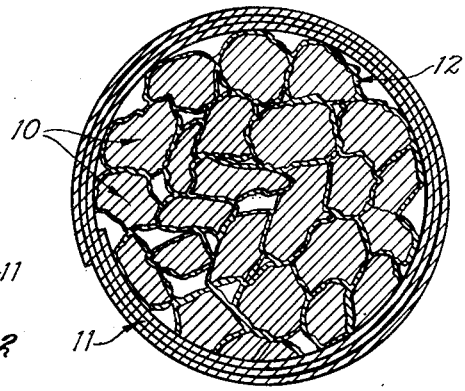
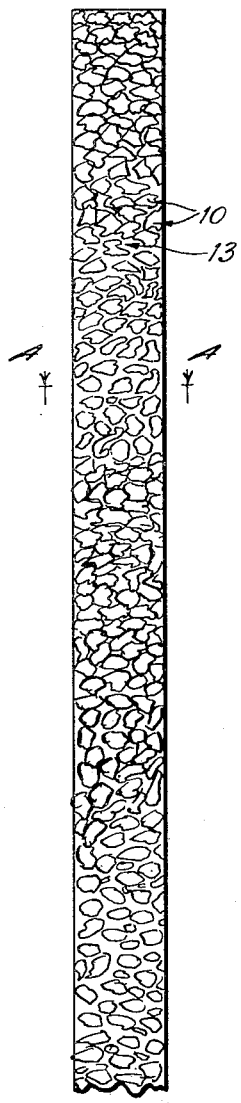
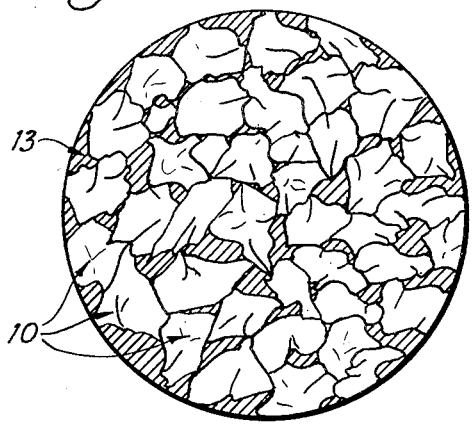
Inventor
NORMAN W. COLE.
By
His Attorney Patented Mar. 20, 1934

1,951,750

UNITED STATES PATENT OFFICE 1,951,750

WELDING ROD

Norman W. Cole, Whittier, Calif., assignor to Globe Oil Tools Company, Los Nietos, Calif., a corporation of California Application July 21, 1930, Serial No. 469,373

5 Claims. (Cl. 219—8)

This invention relates to a welding rod, and it is a general object of the invention to provide a practical, improved welding rod including or carrying hard cutting material.

Hard refractory metals have been developed suitable for use in cutting devices or tools. In most cases these metals are compounds of tungsten and carbon and are applied to mountings or holders by welding. At the present time the cutting parts of well drills, and the like, are usually faced with hard cutting metals. The metals are frequently used in small pieces or fragments, and to facilitate handling the pieces or fragments have been put in tubes formed of soft metal that will fuse as the rod is used. In practice, it is necessary to employ tubes of limited size otherwise the hard metal will fall out of the tubes in the course of use. The soft metal of the holding tubes is recognized as undesirable in that it enters into the finished product with the fragments or pieces of hard cutting metals and is soft and of little or no cutting value. In practice with the tubes of limited size there is a substantial proportion of soft metal introduced into the finished product, in fact it is common to have as much as one-third of the material applied soft metal from the holders or tubes.

It is a general object of this invention to provide a welding rod for carrying or holding hard refractory metals so that they can be handled conveniently and efficiently and which eliminates certain of the undesirable characteristics of welding rods heretofore employed for hard refractory materials.

It is an object of the present invention to provide a welding rod of the character mentioned in which the hard refractory metal parts are held by fusible or combustible non-metallic material, which does not interfere with or weaken the mounting of the hard metal.

It is a further object of this invention to provide a welding rod in which the pieces or particles of hard refractory metal are held in a holder of paper. The paper holder is burned as the rod is used so that the material of the holder does not enter into the mounting of hard metal parts.

It is another object of this invention to provide a holder of the character mentioned which is combustible but non-inflammable and therefore does not interfere with the convenient and efficient handling of the rod.

Another object of the invention is to provide a welding rod in which the pieces or fragments of hard cutting metal are united or joined together by a binder so that they will not fall apart or become unwieldy as the rod is used.

It is a further object of the invention to provide a welding rod of the character mentioned in which the pieces or fragments of hard cutting metal are not only held in a holder but are bonded together by a fusible non-metallic material which does not interfere with the application or bonding of the metal parts to the parts to be faced.

The various objects and features of my invention will be best and more fully understood from the following detailed description of typical forms and applications of the invention, throughout which description reference is had to the accompanying drawing, in which:

Fig. 1 is a longitudinal detailed sectional view of a welding rod embodying the invention showing a rod in which the metal parts or fragments are held by a binder and by a fibrous material in the form of a tube. Fig. 2 is an enlarged detailed transverse sectional view taken as indicated by line 2—2 on Fig. 1. Fig. 3 is a side elevation of another form of welding rod embodying the invention, and Fig. 4 is an enlarged detailed transverse sectional view taken as indicated by line 4—4 on Fig. 3.

The present invention is concerned primarily with holding small particles of fragments of material, such as hard refractory metals, in a manner to facilitate handling such metals in the process of welding. As pointed out above, hard refractory metals are commonly used in facing cutting or wearing parts and are mounted or applied by means of welding. The exact nature or structure of the metals employed varies widely, however, in most cases these metals are compounds of tungsten and carbon, it having been found that compounds of these metals are extremely hard making them particularly valuable on cutting or digging parts such, for instance, as the cutters of drills, and the like. It is to be understood, however, that the present invention is not specifically concerned with the nature of the particles or fragments held in the rod, in fact, in accordance with the broader principles of the invention the particles or fragments may not be metal. It is to be understood, therefore, that when the term "hard metal" is used, it is to include the various materials that may be handled in accordanace with the principles of the invention.

The invention provides, generally, for the holding of hard metal pieces or fragments 10 by a holder which allows for free and convenient handling of the particles in the form of a rod, or the like, but does not weaken or in any way impair the bonding of the metal fragments to the part or parts on which they are to be used.

In accordance with the form of the invention illustrated in Figs. 1 and 2 the holding of the hard metal pieces 10 is effected by a tube 11 of paper and a binder or bonding material 12.

The paper tube 11 may be of any convenient size and weight, it being preferred to employ a hard or tough paper in order to get the desired strength and body with a minimum of bulk. In the drawing the tube is illustrated as being wrapped from a sheet of paper. Paper formed of ordinary pulp is, of course, readily combustible, and therefore when subjected to a welding atmosphere it is immediately oxidized or consumed. At this point it is to be understood that the tube may be made of paper, or the like, formed from various materials or pulps. For example, asbestos may be used to advantage.

The binder 12 provided by the invention is preferably a fusible non-metallic binder which will bond the pieces or fragments 10 together and to the tube 11 to form a rod which is in the nature of a unit and in which the pieces or fragments 10 of metal will not fall from the end of the rod during ordinary handling. In practice sodium silicate may be employed as the binder 12, such material having been found to be practical and effective as a binder and to be particularly valuable and practical in connection with paper formed of ordinary pulp. The sodium silicate binder not only bonds the particles of hard metal to each other, but, being applied to the tube 11, renders the tube non-inflammable.

In the manufacture or formation of the rod illustrated in Figs. 1 and 2 the hard metal pieces 10 are filled into the tube 11 and, if necessary, the tube is agitated to pack the pieces 10 tightly together. A solution of sodium silicate is then introduced into the tube. In fact, the tube filled with the hard metal may be submerged in a solution of sodium silicate so that the entire assembly is coated. In practice the solution of sodium silicate may vary in strength or as to its degree of concentration. It has been found that satisfactory results are obtained by employing two parts water and one part concentrated sodium silicate. This forms a rather thin solution so that the tube when withdrawn from the solution may be drained leaving only enough sodium silicate on the tube and pieces of metal 10 to bond the pieces of metal together and to the tube and to render the tube non-inflammable. By thus using a rather thin solution of sodium silicate and by draining all excess sodium silicate from the tube and hard metal, the finished rod contains a very small amount of sodium silicate, in fact so little sodium silicate that it is negligible as far as its influence on the welding operation is concerned. The slight amount of sodium silicate present is beneficial as it acts as a flux.

In the form of the invention shown in Figs. 3 and 4 materials the same as those hereinabove mentioned may be employed, however, in place of employing a tube of paper, or the like, material such as might be employed in the formation of the paper, is used in the form of pulp mixed with the sodium silicate solution to form a binder mass 13 in which the metal pieces or bodies 10 may be embedded. In this form of the invention a pulpy mass 13, say, of paper pulp and sodium silicate, is prepared and the metal pieces 10 are mixed with or introduced throughout the mass 13 whereupon the mass is formed, for instance, molded or otherwise shaped as desired to form a rod or body suitable for handling.

The welding rod provided by this invention may be employed in various manners. It has been found to be highly practical to first form a puddle, on the surface to which the hard metal pieces are to be applied, by applying a torch, or the like. Upon the formation of the puddle the torch may be withdrawn and the end of the welding rod applied to the puddle. The heat of the molten material of the puddle will soften the binder of the rod allowing a few of the hard metal pieces to drop from the rod into the puddle. It will be obvious that the heat of the puddle is sufficient to oxidize the paper or pulp present in the rod and that the ash left from the combustion of the pulp is so little as to be negligible. The pieces or particles of hard metal dropped into the puddle are, of course, effectively held as the puddle cools and the metal solidifies. To apply the pieces 10 of the hard metal over a large area or along the edge, the operator progresses over the surface or along the edge, puddling the metal of the surface or edge, and applying the rod, allowing the desired amount of hard metal to drop into the puddle and thus be bonded to the surface or edge.

From the foregoing description it is to be particularly noted that the welding rod provided by this invention is entirely free of metal other than the hard metal desired to be applied to the cutting edge or mounting, and therefore the rod does not introduce into the mounting any soft metal tending to weaken or soften the mounting as is the case with the form of welding rods heretofore used to handle small pieces or bodies of hard metal. It will also be apparent that the combustible pulp entering into the rod is completely burned out at the temperatures at which the rod is used and that the extremely small amount of sodium silicate or like binder employed in the rod is negligible and does not weaken or impair the bonding of the hard metal parts to the mounting or holder, but is beneficial as a flux.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. A welding rod including, an elongated mass composed of pieces of hard metal having a high melting point so as to retain their identity during the welding process, and a binder of a readily combustible material and a fusible non-metallic material holding the hard metal.

2. A welding rod including, an elongated mass of substantial cross section of pieces of hard metal having a high melting point so as to retain their identity during the welding process, a combustible non-metallic tube carrying the mass, and a fusible non-metallic binder applied to the pieces of the mass.

3. A welding rod including, an elongated mass of substantial cross section of pieces of hard metal having a high melting point so as to retain their identity during the welding process, a combustible non-metallic tube containing the mass, and a fusible non-metallic binder applied to the pieces of metal and tube.

4. A welding rod including, a combustible non-metallic tube, a filling of pieces of hard metal filling the tube, the pieces of hard metal having a high melting point so that they are not melted or fused during the welding process, and a sodium silicate binder applied to the metal.

5. A welding rod including, a paper tube, a filling of pieces of hard metal filling the tube, the pieces of hard metal having a high melting point so that they are not melted or fused during the welding process, and a binder of sodium silicate holding the metal and coating the tube.

NORMAN W. COLE.